(12) United States Patent
Rune

(10) Patent No.: US 6,434,396 B1
(45) Date of Patent: Aug. 13, 2002

(54) METHOD IN A CELLULAR RADIO COMMUNICATIONS SYSTEM

(75) Inventor: Johan Rune, Lindingö (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/089,726

(22) Filed: Jun. 3, 1998

(30) Foreign Application Priority Data

Jun. 6, 1997 (SE) ................................................ 9702177

(51) Int. Cl.[7] .............................. H04B 15/00; H04B 1/38
(52) U.S. Cl. ........................................ 455/502; 455/561
(58) Field of Search ................................ 455/422, 560, 455/561, 426, 450, 452, 502, 503

(56) References Cited

U.S. PATENT DOCUMENTS

| | | | |
|---|---|---|---|
| 5,519,697 A | * 5/1996 | Fujita et al. | 370/58.3 |
| 5,590,398 A | * 12/1996 | Matthews | 455/33.1 |
| 5,761,193 A | * 6/1998 | Derango et al. | 370/312 |
| 5,930,248 A | * 7/1999 | Langlet et al. | 370/347 |
| 5,930,706 A | * 7/1999 | Raith | 455/422 |

FOREIGN PATENT DOCUMENTS

| | | | |
|---|---|---|---|
| EP | 0687 118 A2 | 12/1995 | |
| WO | 95/04420 | * 2/1995 | |
| WO | WO 9601030 A2 | 1/1996 | |
| WO | WO 96/22666 | 7/1996 | |
| WO | WO 9716940 A1 | 5/1997 | |
| WO | WO 9720446 A2 | 6/1997 | |

OTHER PUBLICATIONS

Hedman, Peter; *PCT International–Type Search Report*, Search Request No. SE 97/00736, Mar. 27, 1998, pp. 1–4.

\* cited by examiner

*Primary Examiner*—Vivian Chin
*Assistant Examiner*—Charles N. Appiah
(74) *Attorney, Agent, or Firm*—Jenkens & Gilchrist, P.C.

(57) ABSTRACT

The present invention relates to a method in a cellular radio communications system of minimising the set-up delay for a mobile terminated message, which is divided into one or more data units (DU1–DUi). The inventive method is carried out by multicasting the message (DU1–DUi) to at least two selected base stations (BS1–BS4) in the vicinity of the mobile station (MS). Thereafter, at least one first data unit (DU1) of the message (DU1–DUi) is simultaneously transmitted in an initial signal (P(DU1)), which is sent out from the base stations (BS1–BS4) and directed to the mobile station (MS). Any subsequent data units (DU2–DUi) in the message (DU1–DUi) are unicast (BS2; CHX(DU2)–CHX(DUi)) to the mobile station (MS), via one of the originally selected base stations (BS2). The mobile station (MS) returns a positive acknowledgement (ACK) after each correctly received data unit (DU1–DUi).

22 Claims, 7 Drawing Sheets

METHOD IN A CELLULAR RADIO COMMUNICATIONS SYSTEM

FIELD OF INVENTION

The present invention relates to a method in a cellular radio communications system of minimising the set-up delay for a connection between the stationary part of the system and a particular mobile station roaming in the system, when delivering a mobile terminated message.

DESCRIPTION OF THE PRIOR ART

In the patent document WO-A1-96/22666 is disclosed a control data transfer device with load reduction for a mobile communications system, which has one digital and/or analogue control channel dedicated to multi-user signals. The document also teaches an efficient method of paging and finding a mobile station. Various kinds of alerting signals are sent out over a wide location area. From the page response signal is then determined whether or not the mobile station is equipped with a multi-user terminal, in order to reduce the amount of later control signalling within the communications system.

Through EP-A2-0,687,118 is previously known a method of global paging with reverse call set-up in a wireless personal communications system. The paging signal is comprised of a caller identification code and a callee identification code. The former code is used for setting up a reverse call from the called mobile station to the call initiator. The originating communications device is, however, billed for the call.

SUMMARY OF THE INVENTION

The present invention provides a solution to the problems that are associated with long set-up delays in a cellular radio communications system. It is of particular importance to reduce this initial delay when serving bursty traffic, such as data communication, where short messages are transmitted at irregular intervals.

The solution, which is described in WO-A1-96/22666 relates to a process of locating a mobile station and efficiently setting up a connection to it by studying the page response signal returned from the mobile station. There is not taught or even suggested that any additional data should be included in the page signal itself.

According to EP-A2-0,687,118 a certain type of data, the caller identity, is included in the page signal. However, the sole purpose of this data is to make possible a reverse call from the callee. It is true that the page signal comprises data, but the teachings of the document do not advise including any other kind of data, such as payload information or channel allocation instructions, in the page signal.

One object of the present invention is to further reduce the set-up delay for a message directed to a mobile station, a so called mobile terminated call.

Another object of the invention is to reduce the total transmission time for a mobile terminated message.

Yet another object of the invention is to minimise the radio and network resources requirements for transmitting payload information from the stationary part of a cellular radio communications system to a particular mobile station, once a connection has been established with the mobile station.

According to a first embodiment of the inventive method a message, containing payload information, is to be transferred to a specific mobile station from the stationary part of a cellular radio communications system. The message is divided into one or more data units of a predetermined size. A first data unit of the message is multicast from a central node in the stationary part of the communications system, to at least two base stations in the vicinity of the mobile station. The multicast connection between the central node and the base stations may be either semi-permanent or determined on demand from the central node.

Which particular base stations that are located in the vicinity of the mobile station may be determined by considering which base stations that serve the latest registered location or routing area for the mobile station. However, the vicinity question may also be solved by taking into consideration more precise information regarding the location of the mobile station. A mobile station's position can, for instance, be calculated from GPS-signals (Global Positioning System) received by the mobile station or by triangulation measure-ments, either on radio signals from at least three nearby base stations received by the mobile station or on radio signals from the mobile station received by three or more base stations.

An initial signal, including the first data unit of the message, is then transmitted to the mobile station from the base stations in the vicinity of the mobile station. After having received the initial signal, the mobile station answers the initial signal and thereby acknowledges correct reception of the first data unit. An unanswered initial signal is interpreted as a negative acknowledgement and induces the communications system to repeat the initial signal.

The method according to the invention is hereby characterised by the features set forth in the characterising clause of claim 1.

According to one advantageous and preferred embodiment of the invention, the initial signal is a page signal, which is sent out from all base stations being responsible for communication with mobile stations within a current location area of the mobile station, that is the intended recipient of the message.

According to another preferred embodiment of the invention, the initial signal moreover includes a notification to the mobile station, of a transmission resource, typically a dedicated channel, which is to be used for transmission of the remaining data units in the message.

According to an alternative embodiment of the invention, a positive acknowledgement, indicating correct reception the first data unit, is returned from the mobile station before a transmission resource is allocated to enable transmission of any further data units in the message.

The fact that, according to inventive method, at least one payload containing data unit is included in the very first signal sent to the mobile station, guarantees a very short set-up delay for a connection between the stationary part of the system and the mobile station, even if the mobile station's position is not specifically known.

In the case of very short messages being transmitted, one-data-unit messages in particular, the inventive method also results in shortest possible total transmission times, and thus a very efficient usage of the available network and radio resources.

The invention will now be described in more detail with reference to preferred exemplifying embodiments thereof and also with reference to the accompanying drawings.

DESCRIPTION OF PREFERRED EMBODIMENTS

Figure 1:
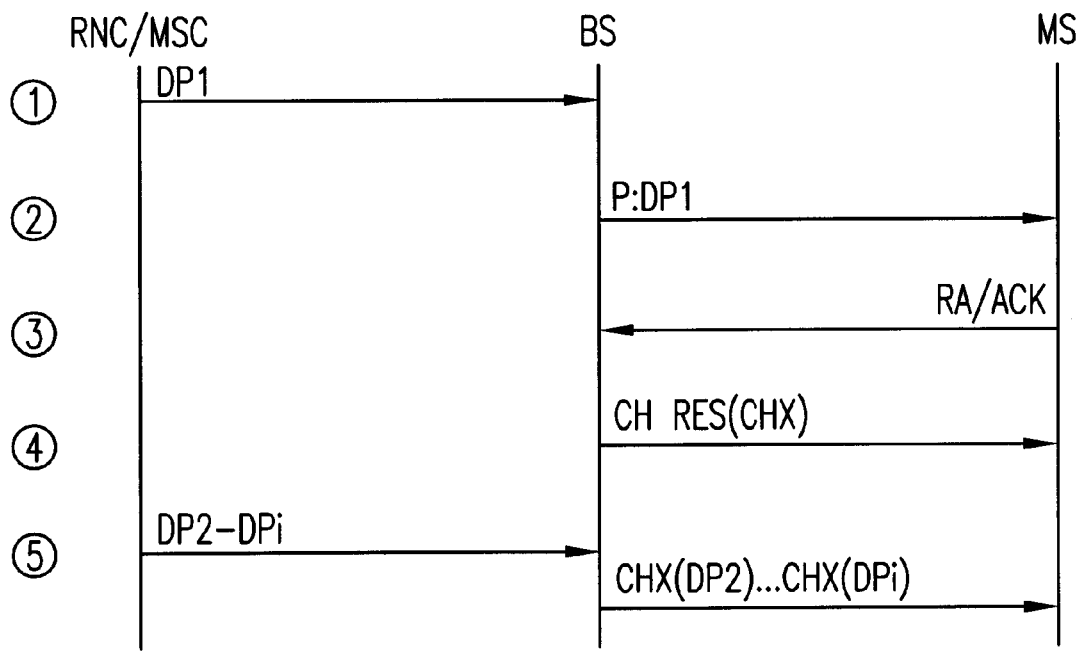
FIG. 1 is a flowchart which visualises a first known procedure for transmitting a message to a mobile station whose cell position is known on beforehand.

FIG. 1 illustrates by means of a flowchart a first recognised procedure for transmitting a message to a particular mobile station MS whose cell position is known on beforehand. Consequently, this procedure implies that a specific base station BS has already been pointed out as being responsible for communication with the mobile station MS. Furthermore, the message is assumed to comprise one or more data packets DP1–DPi of a predetermined size.

First, a central node, such as a MSC (Mobile services Switching Centre) or a RNC (Radio Network Control node), in the stationary part of the cellular radio communications system transmits a first data packet DP1 to a base station BS being responsible for communication with the mobile station MS. Second, a page signal P:DP1, to which is appended a data packet DP1, is sent out from the base station BS on a dedicated paging channel. Third, the mobile station MS responds to the page signal P:DP1, by sending a random access signal RA and a positive acknowledgement ACK of correct reception of the first data packet DP1 on a channel dedicated for this purpose, e.g. a random access channel. Alternatively, the positive acknowledgement ACK may be incorpo-rated in the random access signal RA.

If the page signal P:DP1 has been apprehended by the mobile station MS, but the data packet DP1 has been incorrectly received, the mobile station MS indicates this fact by sending a negative acknowledgement. The page signal P:DP1 will be repeated in case it has not been responded to within a preset time interval.

After reception of a random access signal RA and/or a positive acknowledgement ACK from the mobile station MS, a dedicated channel CHX is allocated at the base station BS, by transmission of a channel reservation message CH RES(CHX) from the base station BS to the mobile station MS. Once a connection is established on a dedicated channel CHX, transmission of any further data packets DP2–DPi may be completed via this channel CHX. Naturally, each of these data packets is acknowledged and re-transmitted, if incorrectly received, according to a procedure corresponding to what has been described for the first data packet DP1. Since there exists a number of options as how to perform this in detail, the steps necessary are not explicitly depicted in the diagram.

Figure 2:
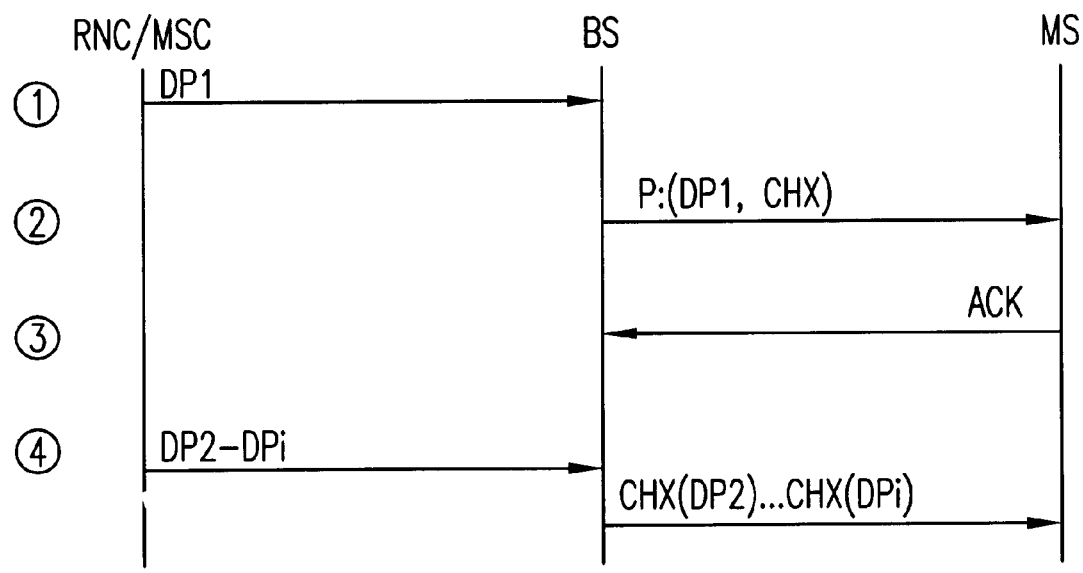
FIG. 2 is a flowchart which visualises a second known procedure for transmitting a message to a mobile station whose cell position is known on beforehand.

FIG. 2 visualises in flowchart form a second known procedure for transmitting a message to a mobile station MS, whose cell position has been previously determined. A base station BS has also in this case already been assigned for communication with the mobile station MS. The message is assumed to comprise one or more data packets DP1–DPi of a predetermined size.

Initially, a first data packet DP1 is sent to the base station BS from a central node in the stationary part of the cellular radio communications system, such as a MSC or a RNC. Then, the base station BS transmits a page signal P(DP1, CHX), on a paging channel, in which is included both channel CHX information and the first data packet DP1. The channel information indicates which channel CHX that will be used for transmitting any subsequent data packets DP2–DPi of the message between the base station BS and the mobile station MS. When the mobile station MS has correctly received the information included in the page signal P(DP1, CHX), it returns a positive acknowledgement ACK on the uplink of the allocated channel CHX. In case of incorrect transmission of the data packet DP1, the mobile station MS instead returns a negative acknowledgement. If the channel information CHX is received incorrectly, the page signal P(DP1, CHX) will not be replied to by the mobile station MS and is therefore repeated after the expiry of a preset time interval.

As soon as the mobile station MS has indicated that the first data packet DPi has been received correctly, via a positive acknowledgement ACK, any remaining data packets DP2–DPi in the message will be transmitted on the dedicated channel CHX, according to a procedure whereby the mobile station MS returns positive or negative feed back information for each data packet received DP2–DPi, depending on the status of the individual packet. The message transmission will continue until all data packets DP1–DPi of the message have been received correctly by the mobile station MS.

Figure 3:
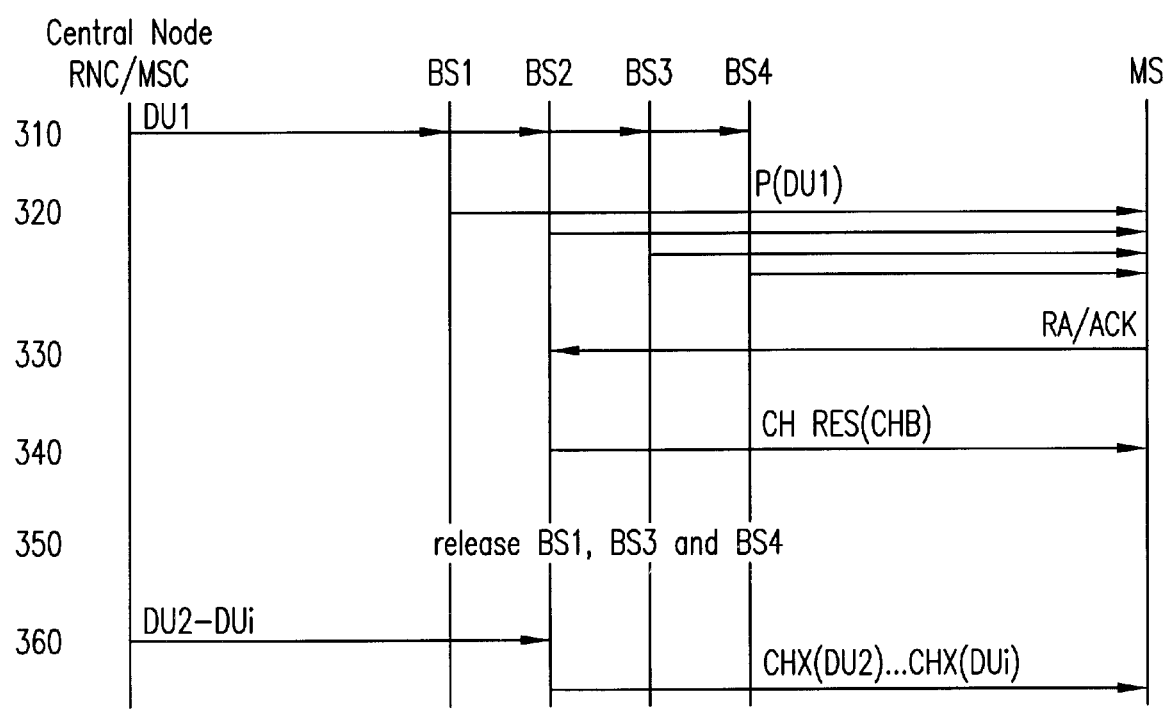
FIG. 3 is a flowchart which visualises a method according to a first embodiment of the invention for transmitting a message to a mobile station at an unknown cell position.

A method according to a first embodiment of the invention for transmitting a message to a mobile station, whose cell position is unknown, is illustrated in flowchart form in FIG. 3. The message to be transmitted is composed of one or more data units DU1–DUi, which, for instance, may be data packets. Initially, a first data unit DU1 of the message is multicast from a central node, in the stationary part of the cellular radio communi-cations system, to at least two base stations BS1–BS4 in the vicinity of the mobile station MS. The central node is preferably a node which directly or indirectly connects a plurality of base stations.

Consequently, the central node is either a MSC (Mobile services Switching Centre) or a RNC (Radio Network Control node). Exactly which base stations BS1–BS4 that are located in the vicinity of the mobile station MS can be determined in a number of different ways.

Most straight forward is to assume that the base stations, which serve the latest registered location area or routing area for the mobile station MS are the base stations, that are closest to the mobile station MS. Alternatively, the vicinity of the mobile station MS may be narrowed down by taking into consideration more precise information regarding the location of the mobile station MS. This can be accomplished by either GPS-signals received by the mobile station MS, which are forwarded to the stationary part of the system, or by triangulation measurements. The triangulation measurements may in their turn either be performed in the mobile station MS on radio signals received from at least three nearby base stations, or in the stationary part of the system, on radio signals from the mobile station received by three or more base stations. The calculation of the mobile station's MS position from the triangulation measurements is, in both cases, preferably carried out in the stationary part of the system. A MSC connected to at least one of the base stations is a suitable unit for this operation. It is, namely, from a power consumption point of view, advantageous to minimise the calculation demands on the mobile station MS. Nevertheless, it is of course possible to locate the position calculation resources in the mobile station MS regardless of where the measurements have been performed, provided that the mobile station MS is supplied with the result of the measurements.

If the latest registered location or routing area for the mobile station MS is utilised to determine which base stations that are closest to the mobile station MS, that in its turn leaves at least two alternatives as to decide which base stations that are encompassed by said area.

One alternative corresponds to the location/routing areas being fixed. This means that a certain location area always comprises the same base stations for all mobile stations.

According to another alternative, the location/routing areas are customised for each mobile station roaming in the cellular radio communications system. A location/routing area is thus established on demand from a mobile station MS. In this case, a particular base station will be included in different location/routing areas depending on which mobile station MS that roams within its vicinity.

Once a location/routing area, or a similar type of area, has been determined, there are two different ways of setting up a multicast connection between the central node and the base stations serving this area.

The multicast connection may be semi-permanent, i.e. temporarily fixed, but possible to change by manual intervention. This is optimal if a particular multicast connection is likely to be demanded frequently. Bursty packet traffic constitutes an example that requires both short set-up delays and frequent use of such identical multicast connections.

The multicast connection may also be established on demand from the central node. Hence, the base stations will be grouped together in different multicast configurations depending on which configuration is, by the central node, decided to be the most effective for the present situation. The use of on-demand multicast connections generally results in more efficient operation of the network and radio resources in the communications system, since the multicast connections then on average can involve a lower number of base stations, than if the multicast connections were semi-permanent. On-demand multicast connections are therefore most efficient if no particular multicast connections are more likely to be used more frequently than any others. However, on-demand multicast connections take longer time to establish and will therefore prolong the set-up delay. The on-demand alternative may, of course, still constitute an interesting compromise between efficient use of resources and set-up delay.

Thus, theoretically there exist four different combinations of fixed contra customised location/routing areas and semi-permanent contra on-demand multicast connections. Even though all combinations are possible, it is nevertheless most advantageous to combine fixed location/routing areas with semi-permanent multicast connections and on-demand multicasting with customised location/routing areas or the more sophisticated methods of determining the mobile station's position, such as the earlier described GPS or triangulation methods.

Once at least two base stations BS1–BS4 in the vicinity of the mobile station MS have been pointed out, according to any of the above mentioned procedures, a first data unit DU1 of the message is multicast 310 from the central node to these base stations BS1–BS4, via a multicast connection being either semi-permanent or set up on-demand from the central node. The first data unit DU1 is then simultaneously sent out 320 from the base stations BS1–BS4 in an initial radio signal, which preferably is a page signal P(DU1), on a respective paging channel. Provided that the mobile station MS is attached, i.e. in radio contact with the stationary part of the system, and has correctly received the page signal P(DU1), it sends 330 a random access signal RA, on channel dedicated for this purpose. Either the random access signal RA includes an acknowledgement ACK of correct reception of the first data unit DU1 or it is in itself interpreted as such an acknowledgement. If the mobile station MS has not responded to the page signal P(DU1) within a predetermined time interval, the page signal P(DU1) will be repeated. Only a limited number of such attempts, say ten, are effectuated though, in order to avoid an abundance of futile page signals P(DU1) being directed to an unreachable mobile station MS. In case of incorrect reception of the data unit DU1, the mobile station MS returns a negative acknowledgement and the page signal P(DU1) is repeated by the base station BS2, to which the mobile station MS returned the negative acknowledgement, until a positive acknowledgement ACK is returned 330.

The response message RA; ACK, transmitted from the mobile station MS, is directed to a base station BS2, which, according to signal strength measurements performed by the mobile station MS, is a preferred base station and from which the mobile station MS received the page signal P(DU1). A preferred base station BS2 is selected, by the mobile station MS, from all base stations whose radio signals can be received by the mobile station MS, on the criteria that the signals transmitted from the preferred base station BS2 are received at a higher power level than the signals from any other base station. In GSM (Global System for Mobile communication), this base station is called the active base station for the mobile station MS. Thus, by responding to the initial signal P(DU1) the mobile station MS implicitly reveals its cell position to the stationary part of the system. The base stations BS1, BS3 and BS4 that did not receive a response from the mobile station MS are hence redundant for the transmission of any subsequent data units DU2–DUi to the mobile station. A transmission resource for transmitting the remaining part of the message is allocated 340 CH RES(CHB) at the preferred base station BS2.

Typically, the allocated transmission resource is a dedicated traffic channel CHB, but it may also be a shared channel or multiple time slots, like e.g. in GPRS (General Packet Radio Service).

The redundant base stations BS1, BS3 and BS4, which did not receive a response signal RA/ACK from the mobile station MS, are released 350, according to one of two alternative procedures, as soon as a transmission resource has been allocated at the base station BS2, which did receive the response signal RA/ACK. If the multicast connection 310 was set up on-demand, the connections between the central node and the redundant base stations BS1, BS3 and BS4 can be cleared immediately simply by re-definition in the central node of the multicast connection to comprise only the base station BS2. If the multicast connection is semi-permanent, then a regular point-to-point connection is established between the central node and the non-redundant base station BS2.

Any subsequent data units DU2–DUi are after that transmitted 360 to the mobile station MS over the transmission resource CHB allocated at the base station BS2.

Figure 4:
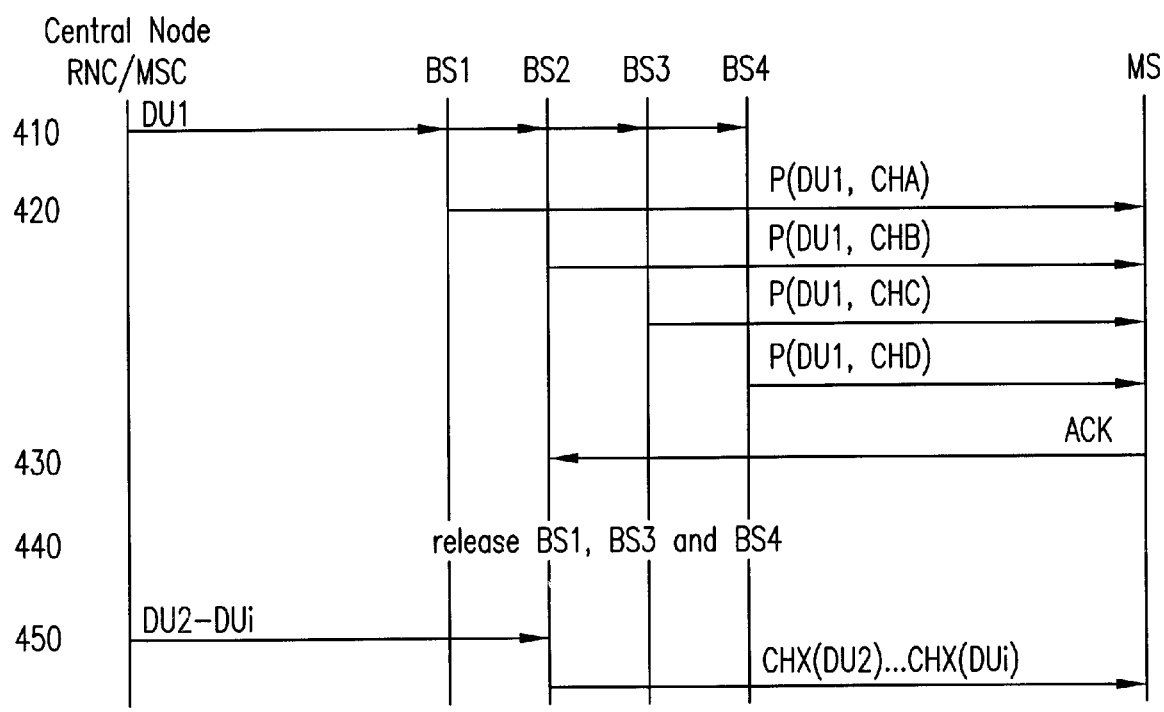
FIG. 4 is a flowchart which visualises a method according to a second embodiment of the invention for transmitting a message to a mobile station at an unknown cell position.

A second embodiment of a method according to the invention for transmitting a message to a mobile station at an unknown cell position is visualised in flowchart form in FIG. 4. The message is also in this case composed of one or more data units DU1–DUi, which typically are data packets.

At least two base stations BS1–BS4 are selected as being located within the vicinity of the mobile station MS in accordance with any of the alternative methods described for the first embodiment of the invention. Then, a first data unit DU1 of the message is multicast 410 from a central node, a MSC or a RNC, in the stationary part of the cellular radio communications system, to the selected base stations BS1–BS4. The multicast connection between the central node and the base stations BS1–BS4 may be either semi-permanent or set up on demand from the central node.

Thereafter, initial signals, which preferably are page signals, P(DU1, CHA), P(DU1, CHB), P(DU1, CHC) and P(DU1, CHD), are transmitted 420 from each respective base station BS1–BS4. Each of the initial signals includes a copy of a first data unit DU1 in the message. Every one of the initial signals P(DU1, CHA), P(DU1, CHB), P(DU1, CHC) and P(DU1, CHD) also includes a reservation for a transmission resource, typically a channel reservation CHA, CHB, CHC and CHD, at the respective base station BS1–BS4.

Granted that the mobile station MS is attached, i.e. in radio contact with the stationary part of the system, and has correctly received the page signal P(DU1, CHB), it sends 430 an acknowledgement ACK of correct reception of the first data unit DU1, on a channel dedicated for this purpose, which typically is the up-link of one of the transmission resources previously allocated. If there is no response to the page signal P(DU1, CHB), from the mobile station MS, within a predetermined time interval the page signal P(DU1, CHB) will be repeated. Only a limited number of such attempts, say ten, are effectuated though, in order to avoid an abundance of futile page signals P(DU1, CHB) being directed to an unreachable mobile station MS. In case of incorrect reception of the data unit DU1, the mobile station MS returns a negative acknowledgement. The data unit DU1 can be now repeated in two different ways. Either the page signal P(DU1, CHB) is repeated by the base station BS2, to which the mobile station MS returned the negative acknowledgement, until a positive acknowledgement ACK is returned 430 from the mobile station MS, or the data unit DU1 is repeated on the dedicated transmission resource CHB at the base station BS2, to which the mobile station MS returned the negative acknowledgement, until a positive acknowledgement ACK is returned 430 from the mobile station MS.

The response message ACK, transmitted 430 from the mobile station MS, is directed to a base station BS2, which is a preferred base station for the mobile station MS. Thus, by responding to the initial signal P(DU1) the mobile station MS implicitly reveals its cell position to the stationary part of the system. The base stations BS1, BS3 and BS4 that did not receive a response from the mobile station MS are hence redundant, for the transmission of any subsequent data units DU2–DUi to the mobile station, and are therefore released 440 as soon as a response signal ACK (which may either a positive or a negative acknowledgement) from the mobile station MS has been received. The redundant base stations BS1, BS3 and BS4 are released according to one of the two following alternative procedures. If the multicast connection 410 was set up on-demand, the connections between the central node and the redundant base stations BS1, BS3 and BS4 can be cleared immediately, simply by re-definition in the central node of the multicast connection to comprise only the base station BS2. If the multicast connection is semi-permanent, then a regular point-to-point connection is established between the central node and the non-redundant base station BS2.

Any subsequent data units DU2–DUi are after that transmitted 450 to the mobile station MS over the transmission resource CHB allocated at the base station BS2.

FIGS. 5a–d illustrate a known method for notifying a mobile station MS at an unknown cell position of an incoming message and starting transmission of the message to the mobile station MS. The message is composed of at least one data packet DP1.

Figure 5A:
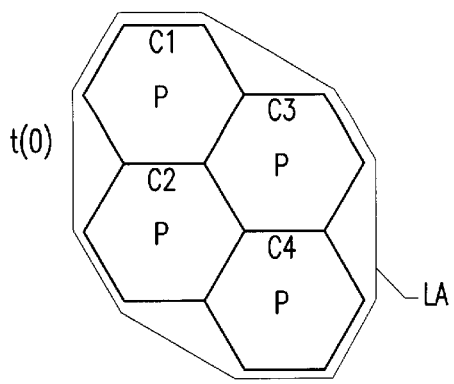
FIGS. 5a–d illustrate a known method for notifying a mobile station at an unknown cell position of an incoming message and starting transmission of it to the mobile station.
Figure 5B:
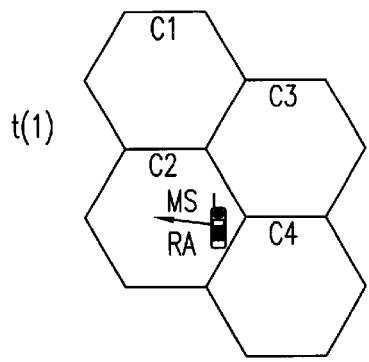
Figure 5C:
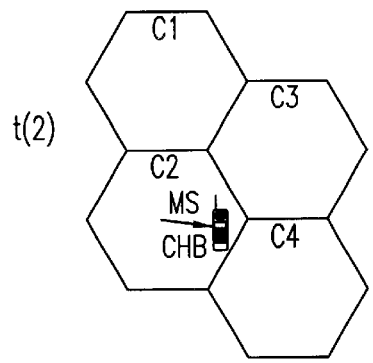
Figure 5D:
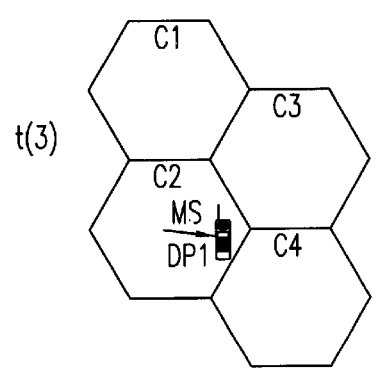

FIG. 5a shows a location area LA, consisting of four cells C1–C4, within which the mobile station MS is supposed to roam. At a time t(0) a page signal P is sent out in each of the cells C1–C4. In FIG. 5b is illustrated how the mobile station MS at a later time t(1) responds to the page signal P, by transmitting a random access signal RA, which is directed to a base station being responsible for cell C2. At yet a later time t(2), this base station allocates a channel CHB for transmitting the message to the mobile station MS. This is shown in FIG. 5c. In FIG. 5d is illustrated how the base station, serving the cell C2, transmits a first data packet DP1 to the mobile station MS on the dedicated channel CHB.

This procedure makes good use of the available radio resources, since a minimal total radio energy is being emitted in the cellular radio communications system. However, the set-up delay is relatively long, which results in long transmission times for short messages.

FIGS. 6a–d illustrate a method according to the first embodiment of the invention for notifying a mobile station MS at an unknown cell position of an incoming message and starting transmission of the message to the mobile station MS. The message is composed of at least one data unit DU1; DU2.

Figure 6A:
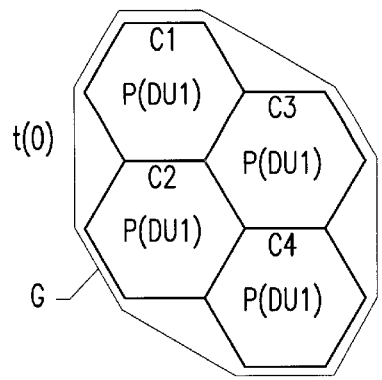
FIGS. 6a–d illustrate a method according to the first embodiment of the invention for notifying a mobile station at an unknown cell position of an incoming message and starting transmission of it to the mobile station.

FIG. 6a depicts a group G of four cells C1–C4, which are served by at least two base stations within the vicinity of the mobile station MS. Typically, the group G constitute a location area, which is either fixed or customised for the mobile station. Nevertheless, the cells C1–C4 in the group G may have been selected according to any of the alternative methods, previously described, for determining the position of the mobile station MS. Initially, a first data unit DU1 of the message is multicast from a central node, like MSC or RNC, to the base stations serving the cells C1–C4 via a multicast connection. The multicast connection between the central node and the base stations which serve the cells C1–C4 may be either semi-permanent or set up on demand from the central node.

Figure 6B:
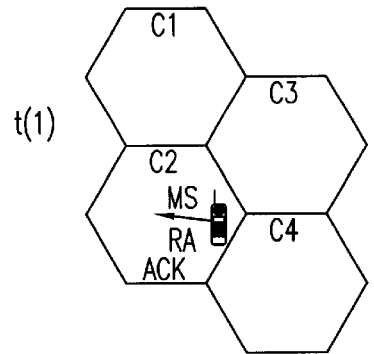

Then, at a time t(0), a page signal P(DU1), including the first data unit DU1, is sent out in each of the cells C1–C4. In FIG. 6b is illustrated how the mobile station MS, at a later time t(1), responds to the page signal P(DU1), by transmitting a random access signal RA and a positive acknowledgement ACK or solely a random access signal RA, which is interpreted as a positive acknowledgement ACK. The response signal from the mobile station MS is in this case directed to a base station being responsible for cell C2, since this base station is the base station preferred by the mobile station MS. After reception of the positive acknowledgement ACK in the stationary part of the communications system, the base stations being responsible for the redundant cells C1, C3 and C4 are released from the call according to one of two alternative ways. If the multicast connection was set up on-demand, the connections to base stations serving the redundant cells C1, C3 and C4 are cleared immediately by re-definition of the multicast connection to comprise only the base station serving the cell C2. If the multicast connection, on the other hand is semi-permanent, a regular point-to-point connection, replacing the multicast connection, is established between the central node and the base station serving the cell C2.

Figure 6C:
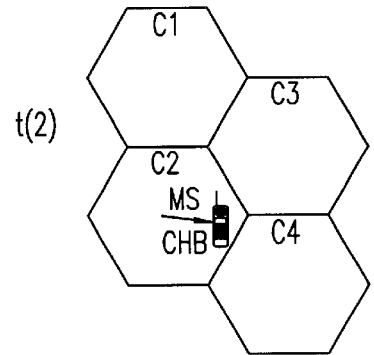
Figure 6D:
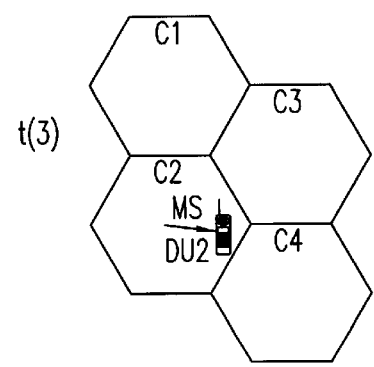

At yet a later time t(2), the preferred base station allocates a channel CHB for transmitting the message to the mobile station MS via cell C2. This is shown in FIG. 6c. In FIG. 6d is illustrated how the base station, being responsible for communication within the cell C2, transmits a second data unit DU2 to the mobile station MS on the dedicated channel CHB.

The above described method efficiently uses the available radio resources. Only slightly more than a minimum amount of radio energy is sent out in the paging phase. The page signal P(DU1) is, of course, somewhat prolonged because of the inclusion of the first data unit DU1. On the other hand, the transmission of the message will be completed sooner. The total radio energy emitted during the transmission will thus be comparable with the procedure described in connection with FIGS. 5a–d.

Furthermore, the set-up delay is very short and the total delay for transmission of the first data unit is minimal. This gives a very short transmission time for one-data-unit messages.

FIGS. 7a–d illustrate a method according to the second embodiment of the invention for notifying a mobile station MS of an incoming message and starting transmission of it to the mobile station MS. The message is composed of at least one data unit DU1; DU2.

Figure 7A:
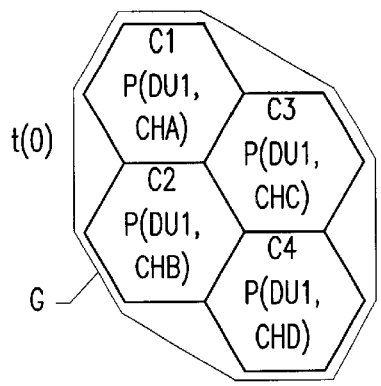
FIGS. 7a–d illustrate a method according to the second embodiment of the invention for notifying a mobile station at an unknown cell position of an incoming message and starting transmission of it to the mobile station.

FIG. 7a shows a group G of four cells C1–C4, which are served by two or more base stations within the vicinity of the mobile station MS. The group G may constitute a location area, which is either fixed or customised for the mobile station, but the cells C1–C4 may also have been selected according to any of the alternative methods, previously described. Initially, a first data unit DU1 of the message is multicast from a central node, such as a MSC or RNC, to the base stations serving the cells C1–C4. The multicast connection between the central node and the base stations which serve the cells C1–C4 may also in this case be either semi-permanent or set up on demand from the central node.

Figure 7B:
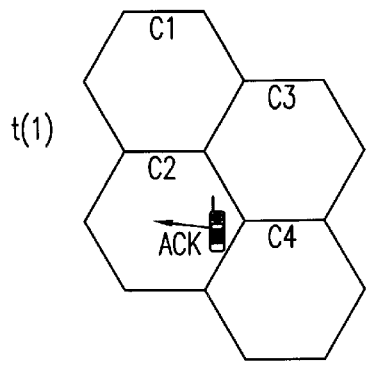

Thereafter, at a time t(0), a page signal P(DU1, CHA), P(DU1, CHB), P(DU1, CHC) and P(DU1, CHD), including the first data unit DU1, is sent out in each of the cells C1–C4. Every one of the initial signals also includes a reservation of a transmission resource, typically a channel reservation CHA, CHB, CHC and CHD, in the respective cells C1–C4. In FIG. 7b is visualised how the mobile station MS, at a later time t(1), responds to the page signal P(DU), by transmitting a positive acknowledgement ACK, which indicates correct reception of the first data unit DU1. Since a base station being responsible for cell C2 is preferred by the mobile station MS, the response signal from the mobile station MS is directed to this base station. The stationary part of the communications system is implicitly informed of the mobile station's MS cell position, through the positive acknowledgement ACK from the mobile station MS. The base stations being responsible for the redundant cells C1, C3 and C4 are released from the call, in one out of two possible ways, after reception of the positive acknowledgement ACK. If the multicast connection was set up on-demand, the connections to base stations serving the redundant cells C1, C3 and C4 can be cleared immediately simply by re-definition of the multicast connection to comprise only the base station serving the cell C2. If the multicast connection is semi-permanent, then instead a regular point-to-point connection is established between the central node and the base station being responsible for communication within the cell C2.

Figure 7C:
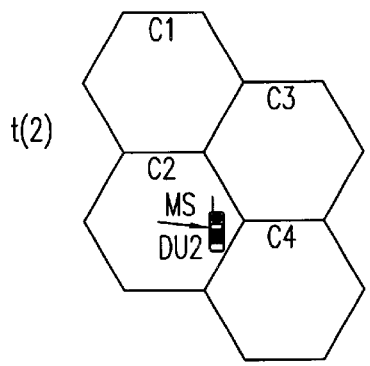
Figure 7D:
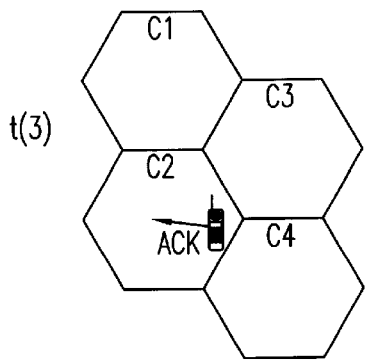

At yet a later time t(2), a second data unit DU2 of the message is transmitted to the mobile station MS, via the allocated transmission resource CHB in the cell C2, in which the mobile station MS responded to the page signal P(DU1, CHB). This is illustrated in FIG. 7c. FIG. 7d shows how the mobile station MS returns, via the uplink of the dedicated transmission resource in cell C2, a positive acknowledgement ACK indicating correct reception of the second data unit DU2.

The above described method results in a minimal delay for transmitting the first data unit DU1 in a message as well as for any subsequent data units DU2.

Furthermore, the total radio energy emitted during the transmission of the message will be comparable with the procedure described in connection with FIGS. 5a–d. Of course, the page signals P(DU1, CHA), P(DU1, CHB), P(DU1, CHC) and P(DU1, CHD) are somewhat longer, but on the other hand the transmission of the message will be completed sooner.

Figure 8:
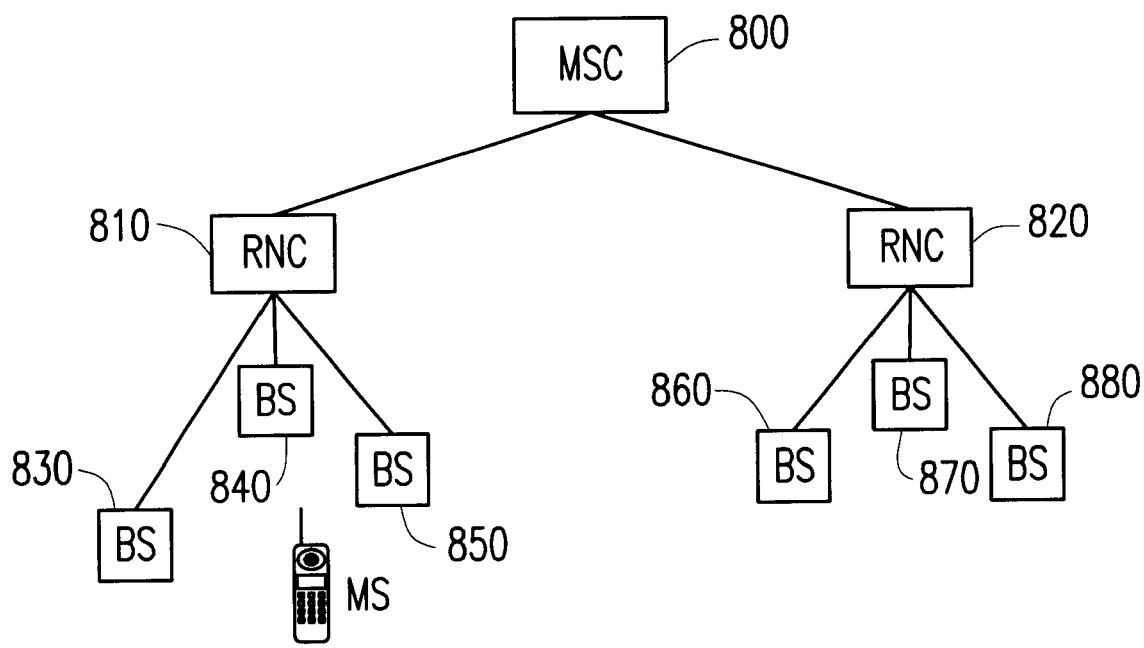
FIG. 8 shows a first example of a physical configuration of system units, which realise a multicast connection according to the invention.

FIG. 8 shows a first example of a physical configuration of system units MSC, RNCs and base stations, which realise a multicast connection according to the invention. A first RNC 810 and a second RNC 820 are connected to a MSC 800. The RNC 810 has a first set of three base stations 830–850 connected to it and the second RNC 820 is linked to a second set of three base stations 860–880. A mobile station MS is the intended recipient of a certain message. The base stations 830–850 in the first set are, according to any one of the earlier described methods, determined to be in the vicinity of mobile station MS. The message is therefore multicast from the MSC 800, via the first RNC 810, to these particular base stations 830–850. A first data unit of the message is then included in an initial signal, which is sent out from the base stations 830–850 and directed to the mobile station MS.

Figure 9:
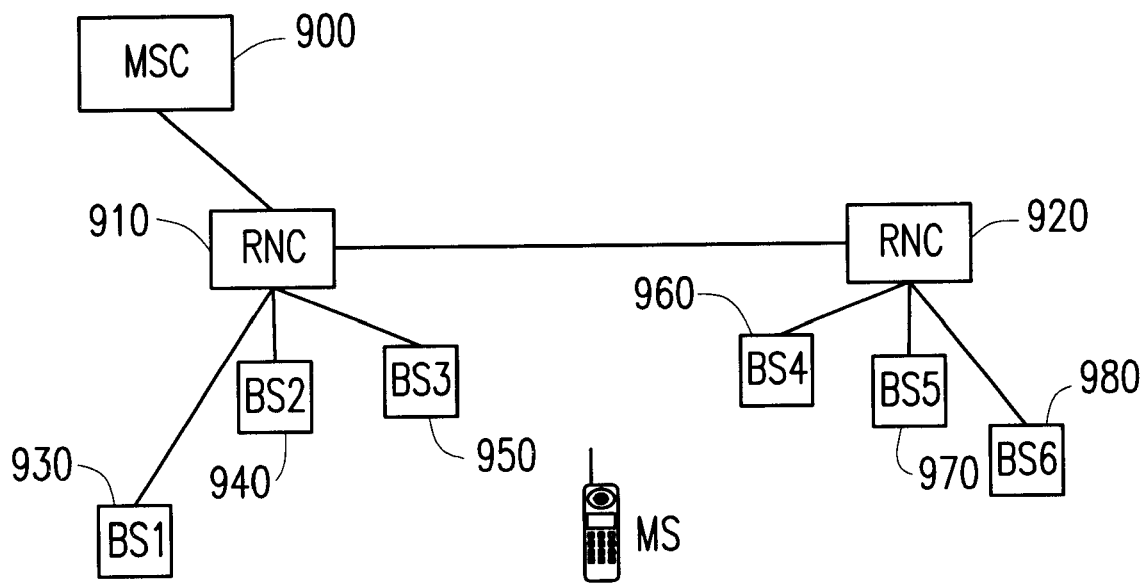
FIG. 9 shows a second example of a physical configuration of system units, which realise a multicast connection according to the invention.

In FIG. 9 is shown a second example of a physical configuration of system units MSC, RNCs and base stations, which realise a multicast connection according to the invention. A first RNC 910 is connected to a MSC 900. The first RNC 910 is also linked to a second RNC 920 and a first set of three base stations 930–950. The second RNC 920 is in its turn connected to a second set of three base stations 960–980. In this case, all the base stations 930–980 are determined to be in the vicinity of mobile station MS. The base stations 930–980 are likewise selected according to any of the previously described methods. The message is thus multicast from the MSC 900 to all the base stations 930–980, via the first RNC 910 and the second RNC 920. A first data unit of the message is then included in an initial signal, which is sent out from the base stations 930–980 and directed to the mobile station MS.

Figure 10:
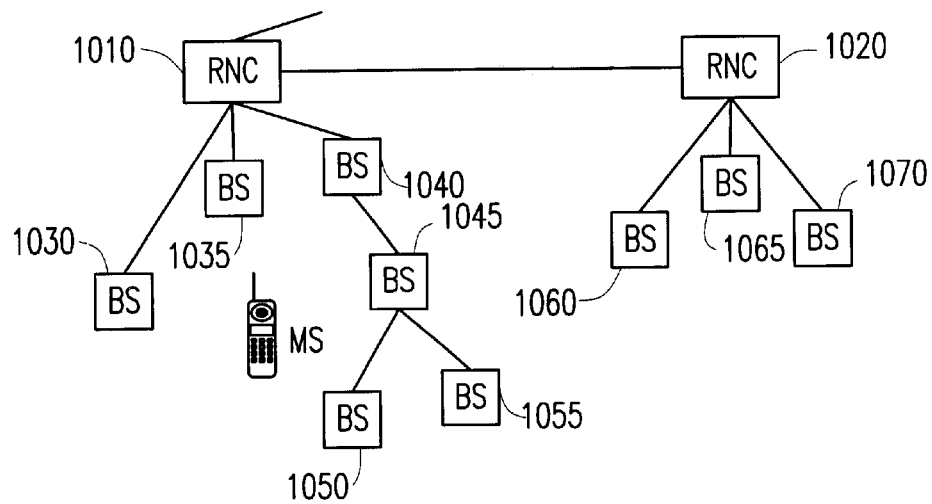
FIG. 10 shows a third example of a physical configuration of system units, which realise a multicast connection according to the invention.

A third example of a physical configuration of system units RNCs and base stations, which realise a multicast connection according to the invention is shown in FIG. 10. A first RNC 1010 is connected to a second RNC 1020 as well as to a first set of three base stations 1030–1040 of which the third 1040 is linked to a fourth base station 1045. The fourth base station 1045 is further connected to a fifth 1050 and a sixth base station 1055. The second RNC 1020 is connected to a second set of three base stations 1060–1070. Here, the base stations 1030–1055 are, according to any of the previously described methods, determined to be in the vicinity of mobile station MS. The message is consequently multicast from the first RNC 1010 to the base stations 1030–1040, to the base station 1045 via the base station 1040 and to the base stations 1050 and 1060, via the base station 1040. A first data unit of the message is then included in an initial signal, which is sent out from the base stations 1030–1055 and directed to the mobile station MS.

Figure 11:
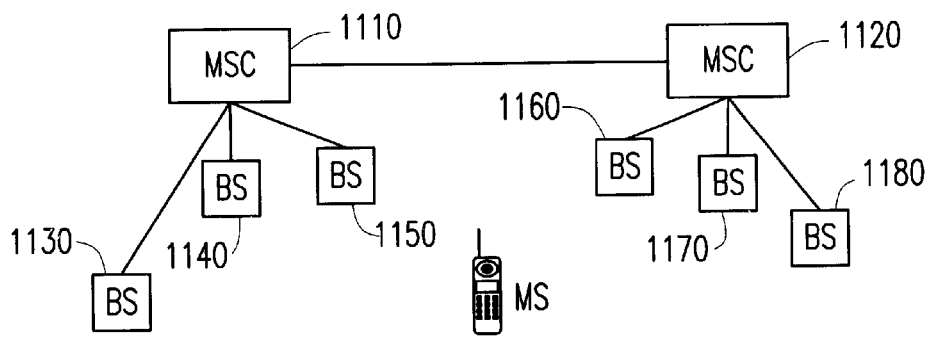
FIG. 11 shows a fourth example of a physical configuration of system units, which realise a multicast connection according to the invention.

FIG. 11 shows a fourth example of a physical configuration of system units MSCs and base stations, which realise a multicast connection according to the invention. A first MSC 1110 is linked to a first set of three base stations 1130–1150 and a second MSC 1120 is linked to a second set of three base stations 1160–1180. In this example, the base stations 1140–1160 are determined to be in the vicinity of mobile station MS and selected according to any of the formerly described methods. Hence, the message is multicast from the first MSC 1110 to the base stations 1140 and 1150 and, via the second MSC 1120, to the base station 1160. A first data unit of the message is then included in an initial signal, which is sent out from the base stations 1140–1160 and directed to the mobile station MS.

Figure 12:
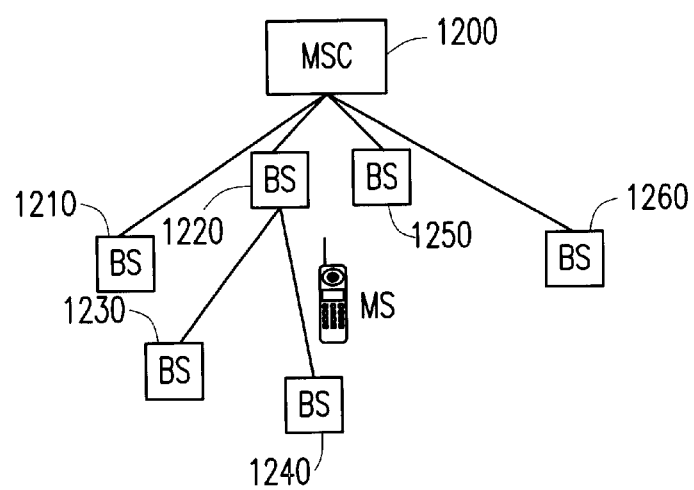
FIG. 12 shows a fifth example of a physical configuration of system units, which realise a multicast connection according to the invention.

A fifth example of a physical configuration of system units MSC and base stations, which realise a multicast connection according to the invention is displayed in FIG. 12. A MSC 1200 is connected to a set of four base stations 1210, 1220, 1250 and 1260 of which the second base station 1220 is further connected to a base station 1230 and a base station 1240. Here, the base stations 1230–1250 are, according to any of the formerly described methods, determined to be in the vicinity of mobile station MS. The message is therefore multicast from the MSC 1200 to the base stations 1220 and 1250 and to the base stations 1230 and 1240, via the base station 1220. A first data unit of the message is then included in an initial signal, which is sent out from the base stations 1220–1250 and directed to the mobile station MS.

What is claimed is:

1. A method in a cellular radio communications system, wherein the cellular radio communications system contains a stationary part comprising a plurality of central nodes and a plurality of base stations, and a mobile part comprising a plurality of mobile stations, the method for transmitting a message composed of at least one communication data unit to a specific mobile station, comprising the steps of:

selecting a group of base stations comprising at least two base stations that are in the vicinity of the specific mobile station at the time of transmitting, defining a multicast connection between a central node and the base stations in the selected group, multicasting at least one first communication data unit of the message from the central node to the base stations in the selected group via the multicast connection, said at least one first communication data unit comprising one of payload data and channel allocation data, and simultaneously sending an initial signal which includes at least said first communication data unit of the message from the base stations in the selected group to the mobile station.

2. The method according to claim 1, wherein the initial signal is a page signal.

3. The method according to claim 1, wherein the initial signal is sent out from base stations serving a current location area of the mobile station.

4. The method according to claim 3, wherein the current location area is fixed.

5. The method according to claim 3, wherein the current location area is customized for the mobile station.

6. The method according to claim 1, further comprising the step of allocating at least one dedicated transmission resource for transmitting subsequent data units in the message from the stationary part to the mobile station.

7. The method according to claim 6, further comprising the steps of:

transmitting feed-back information of the status of the first data unit from the mobile station to the stationary part, and transmitting a separate transmission resource allocation message from the stationary part to the mobile station.

8. The method according to claim 6, wherein the initial signal includes a notification to the mobile station of said dedicated transmission resource.

9. The method according to claim 8, further comprising the step of transmitting feed-back information of a status of the first data unit from the mobile station to the stationary part.

10. The method according to claim 9, further comprising the step of releasing redundant base stations from communicating with the mobile station after receiving an acknowledgment of reception of the first data unit from the mobile station.

11. The method according to claim 10, wherein the acknowledgment indicates correct reception.

12. The method according to claim 10, wherein the multicast connection is semi-permanent.

13. The method according to claim 12, wherein said releasing of redundant base stations is accomplished by establishment of a point-to-point call between the central node and the non-redundant base station.

14. The method according to claim 10, wherein the multicast connection is set up on-demand by the central node.

15. The method according to claim 10, wherein said releasing of redundant base stations is accomplished by re-definition in the central node of the multicast connection to comprise only the non-redundant base station.

16. A method in a cellular radio communications system for minimizing the set-up delay for a connection between a stationary part comprising at least one central node and a plurality of base stations, and a mobile part comprising a plurality of mobile stations, the method for transmitting a message having at least one communication data unit to a specific mobile station, comprising the steps of:

ascertaining a plurality of base stations that are proximate to the specific mobile station prior to transmitting the message, defining a multicast connection between the at least one central node and the ascertained plurality of base stations, multicasting the at least one communication data unit of the message from the at least one central node to the ascertained plurality of base stations via the multicast connection, said at least one communication data unit comprising one of payload data and channel allocation data, and simultaneously, within a predetermined time period, sending an initial signal that includes said at least one communication data unit of the message from the ascertained plurality of base stations to the specific mobile station.

17. The method according to claim 16, wherein the initial signal is a page signal including the message having the at least one communication data unit.

18. The method according to claim 16, wherein the initial signal is transmitted from base stations serving a current location area of the specific mobile station.

19. In a cellular radio communications system, wherein the cellular radio communications system contains a stationary part having a plurality of central nodes and a plurality of base stations, and a mobile part having a plurality of mobile stations, an arrangement for transmitting a message including at least one communication data unit to a specific mobile station, the arrangement comprising:

means for selecting a group of base stations comprising at least two base stations that are in the vicinity of the specific mobile station at the time of transmission, means for defining a multicast connection between a central node and the base stations in the selected group, means for multicasting at least one first communication data unit of the message from the central node to the base stations in the selected group via the multicast connection, said at least one first communication data unit comprising one of payload data and channel allocation data, and means for simultaneously sending an initial signal which includes at least said first communication data unit of the message from the base stations in the selected group to the mobile station.

20. The arrangement as recited in claim 19, wherein the initial signal is a page signal including the message having the at least one communication data unit.

21. The arrangement as recited in claim 19, wherein the initial signal is transmitted from base stations serving a current location area of the specific mobile station.

22. The arrangement as recited in claim 19, further comprising means for allocating at least one dedicated transmission resource for transmitting subsequent data units in the message from the stationary part to the mobile station.

\* \* \* \* \*